United States Patent [19]
McCarville et al.

[11] Patent Number: 5,843,355
[45] Date of Patent: Dec. 1, 1998

[54] METHOD FOR MOLDING A THERMOPLASTIC COMPOSITE SINE WAVE SPAR STRUCTURE

[75] Inventors: Douglas A. McCarville, Auburn, Wash.; Rodney E. Bahr, Wichita, Kans.

[73] Assignee: The Boeing Company, Seattle, Wash.

[21] Appl. No.: 590,606

[22] Filed: Jan. 24, 1996

[51] Int. Cl.$^6$ .......................... B29C 37/02; B32B 31/04; B32B 31/10
[52] U.S. Cl. .......................... 264/152; 264/160; 264/258; 156/197; 156/212; 156/216
[58] Field of Search .................................. 264/145, 160, 264/258, 152; 156/197, 212, 216

[56] References Cited

U.S. PATENT DOCUMENTS

| | | | |
|---|---|---|---|
| 1,916,435 | 7/1933 | Ott et al. ................................ | 264/258 |
| 2,229,982 | 1/1941 | Mansur et al. ........................ | 264/258 |
| 3,137,604 | 6/1964 | Bosch ................................... | 156/197 |
| 3,333,389 | 8/1967 | Lichti .................................... | 52/729 |
| 4,084,029 | 4/1978 | Johnson et al. . | |
| 4,091,254 | 5/1978 | Struve . | |
| 4,197,978 | 4/1980 | Kasper . | |
| 4,198,018 | 4/1980 | Brault . | |
| 4,332,633 | 6/1982 | Yamauchi et al. ..................... | 264/160 |
| 4,378,263 | 3/1983 | Logan ................................... | 264/258 |
| 4,386,990 | 6/1983 | Gluckin ................................. | 264/258 |
| 4,512,836 | 4/1985 | Tucci ..................................... | 264/137 |
| 4,657,717 | 4/1987 | Cattanach et al. . | |
| 4,915,896 | 4/1990 | Rachal . | |
| 4,988,469 | 1/1991 | Reavely et al. ....................... | 264/258 |
| 5,114,654 | 5/1992 | Hosoi .................................... | 264/313 |
| 5,160,562 | 11/1992 | Kuch et al. ........................... | 264/258 |
| 5,171,510 | 12/1992 | Barquet et al. ....................... | 264/258 |
| 5,217,656 | 6/1993 | Buckley et al. ...................... | 264/160 |
| 5,236,646 | 8/1993 | Cochran et al. . | |
| 5,624,618 | 4/1997 | Forman et al. ....................... | 264/258 |
| 5,686,038 | 11/1997 | Christensen et al. ................. | 264/257 |
| 5,707,576 | 1/1998 | Asher .................................... | 264/257 |
| 5,714,179 | 2/1998 | Goodridge et al. ................... | 264/313 |

FOREIGN PATENT DOCUMENTS

| | | | |
|---|---|---|---|
| 0051325 | 5/1981 | Japan ................................... | 264/258 |

*Primary Examiner*—Jan H. Silbaugh
*Assistant Examiner*—Robin S. Gray
*Attorney, Agent, or Firm*—Christensen O'Connor Johnson & Kindness PLLC

[57] ABSTRACT

A method of forming composite sine wave spars from composite material. In accordance with the method, the sine wave spar is formed of web plies, filler plies, separator plies and cap plies. The edges of the web plies are cut to form a plurality of teeth having different geometric configurations. The web plies are first formed to the sine wave contours of a tool having the desired final part geometry. The teeth of the web plies are then folded over the edges of the tool to form a portion of the flanges of upper and lower U-shaped channels. The portions of the flanges of the U-shaped channels not covered by the teeth are formed using filler plies that intermesh with the teeth to form a layer of the flanges of the respective upper or lower U-shaped channel. The flanges are reinforced through the use of separator plies that are placed between the filler plies. The formed upper and lower U-shaped channels are joined together so that their respective flanges are located in line with each other. The triangular recesses between the flanges of the joined upper and lower U-shaped channels are filled with radius fillers having a triangular cross-section. Once the radius fillers are in place, cap plies are placed over the radius fillers and flanges to further reinforce the flanges. In the preferred embodiment, each web ply has eight different teeth configurations. The teeth are configured to fold over the edges of the sine wave contour and cover the edges of the sine wave contour in order to minimize overlapping and gaps between the folded over teeth.

22 Claims, 13 Drawing Sheets

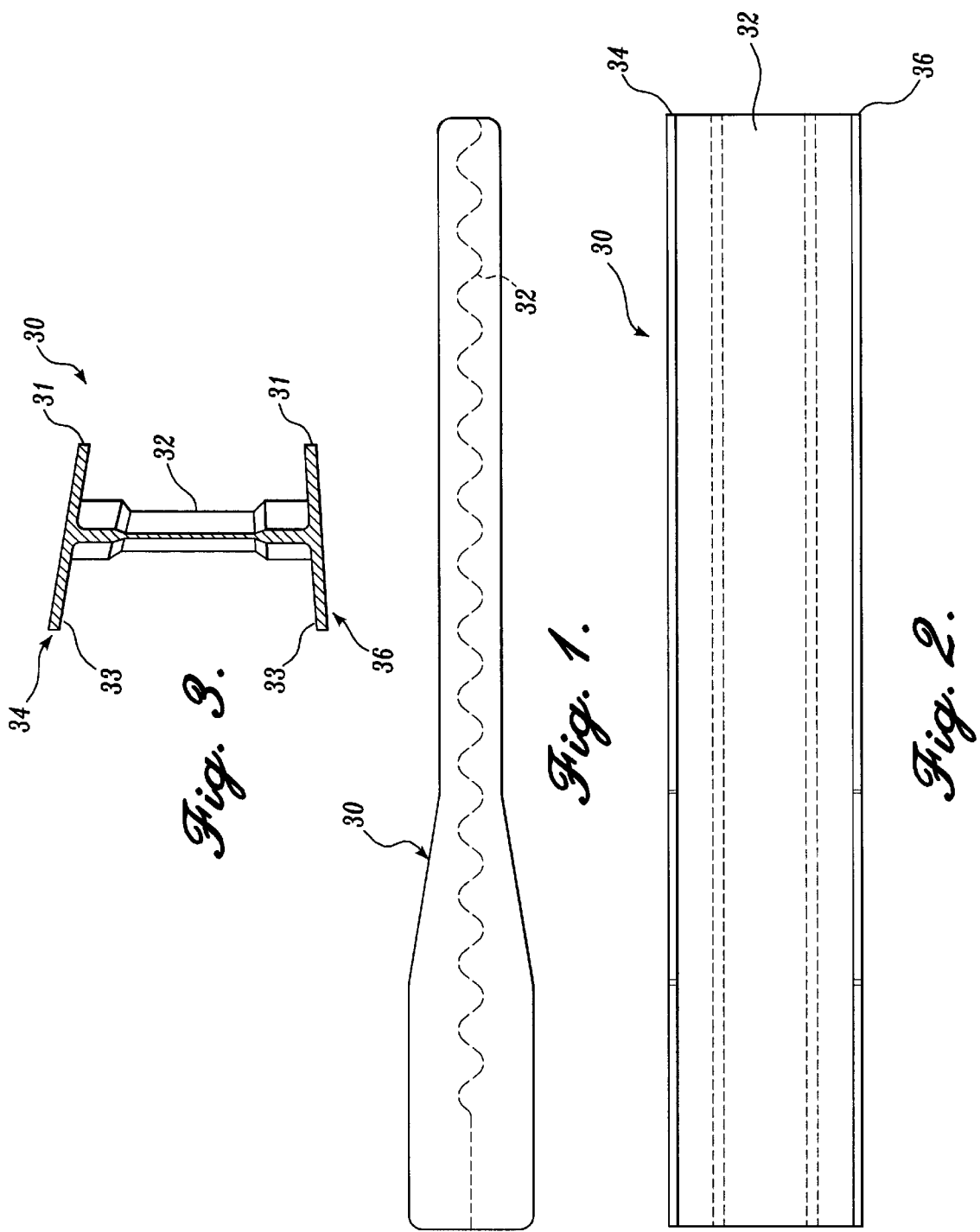

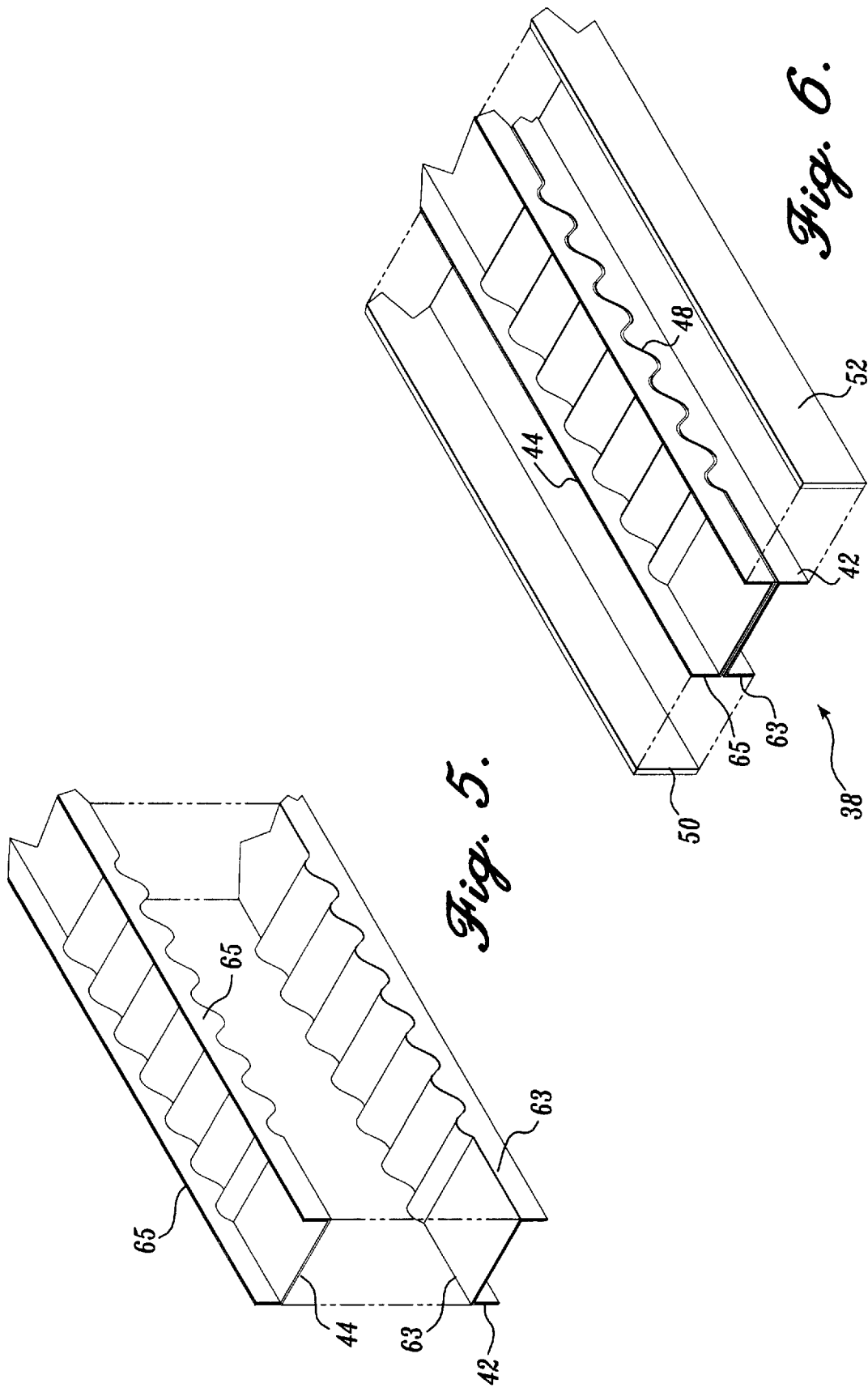

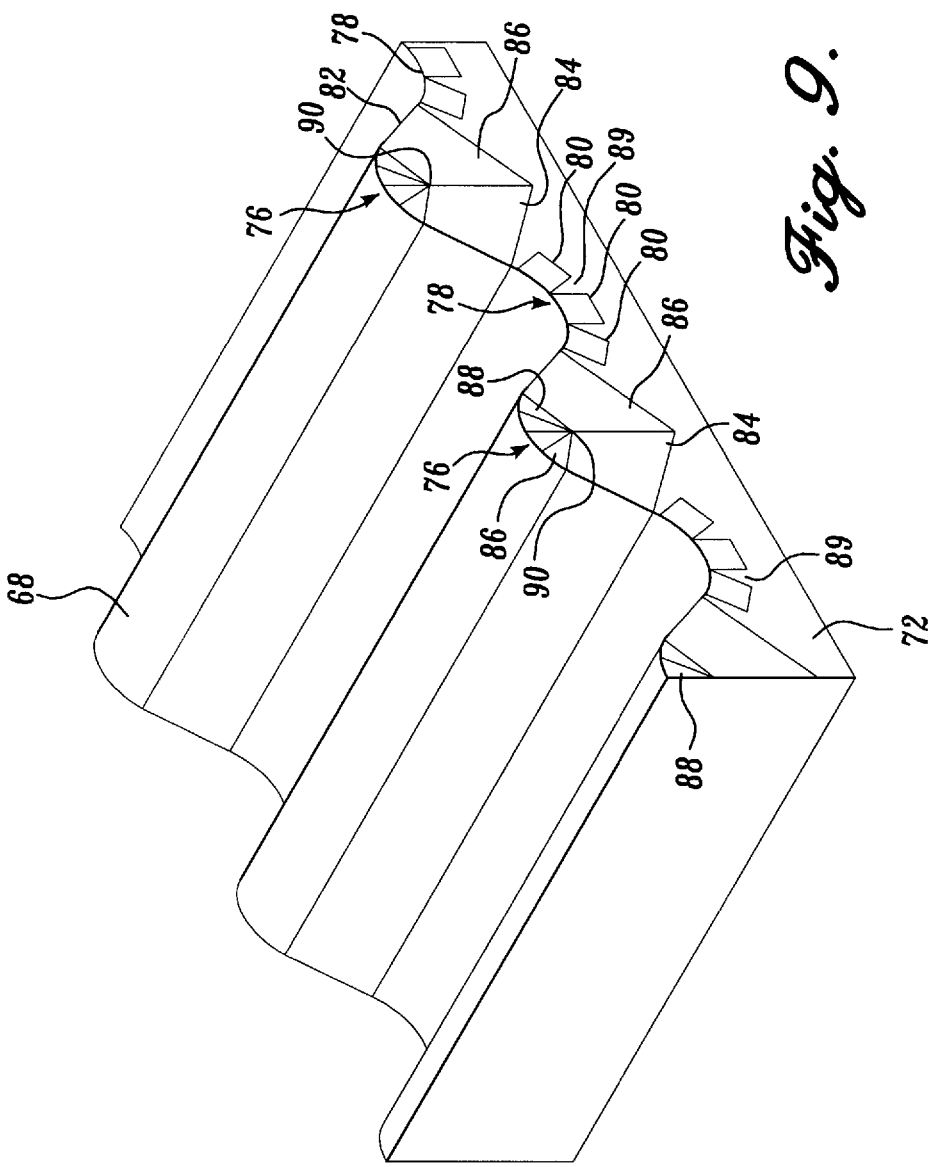

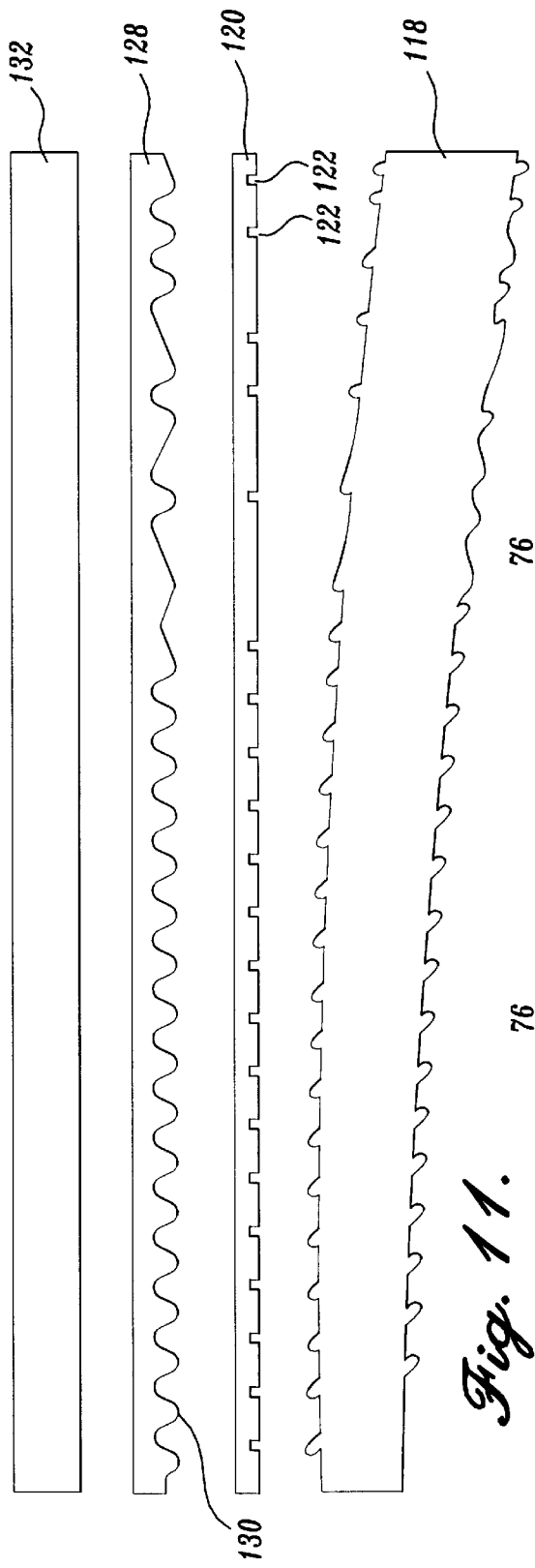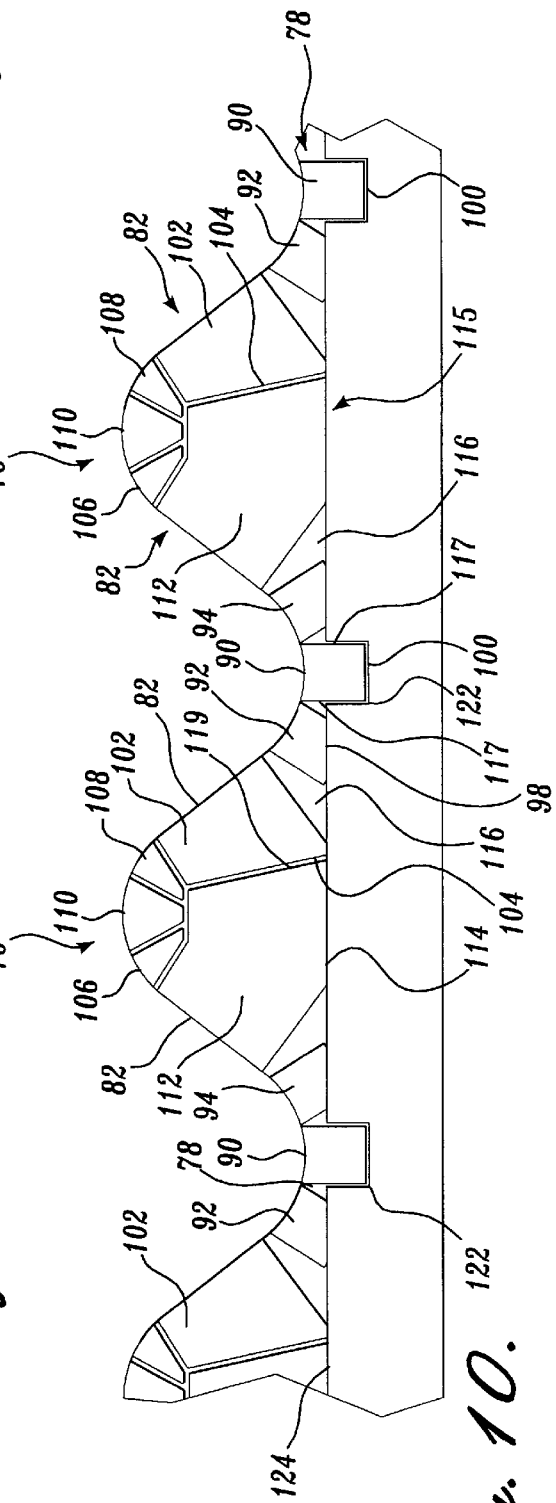

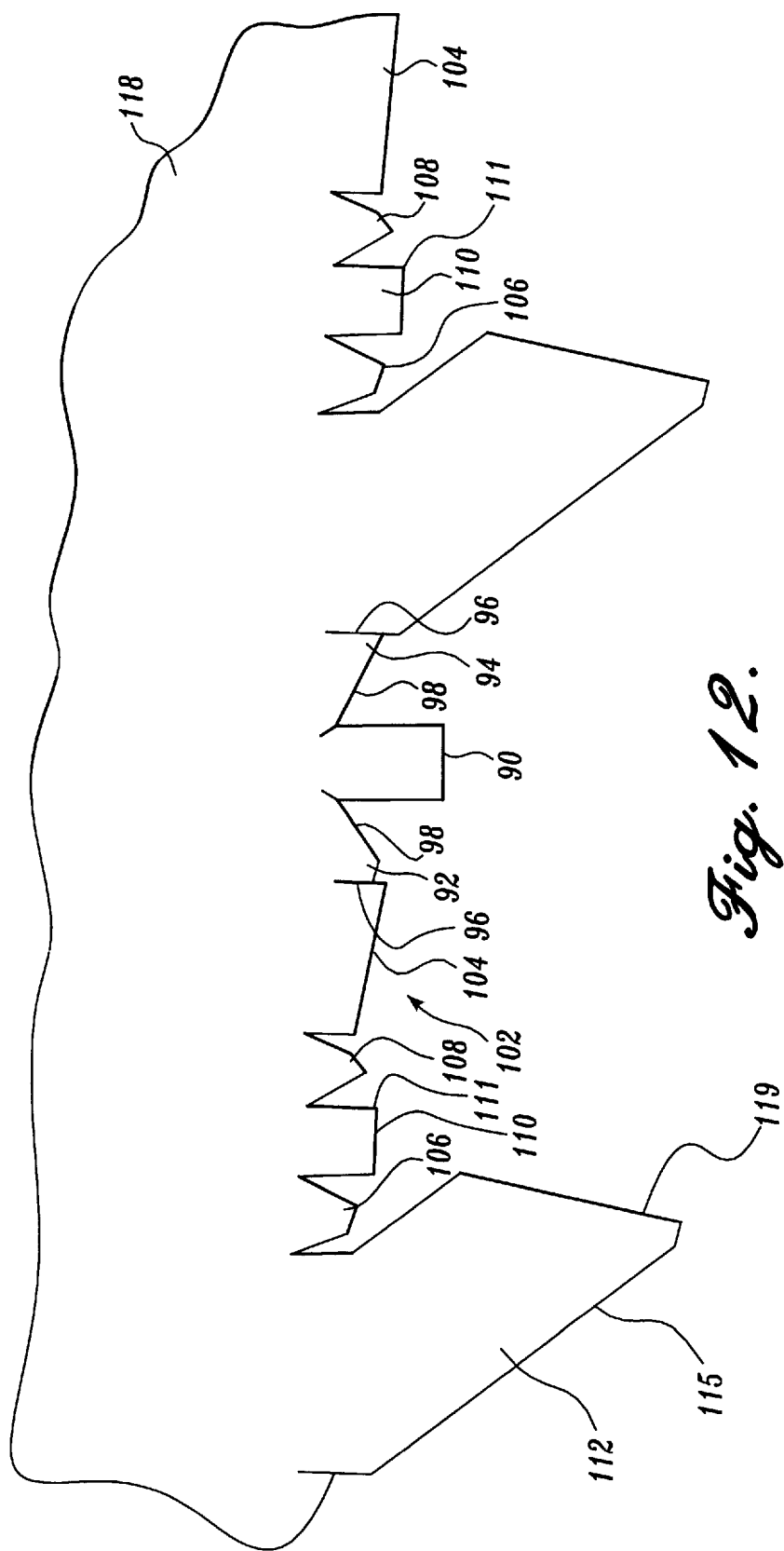

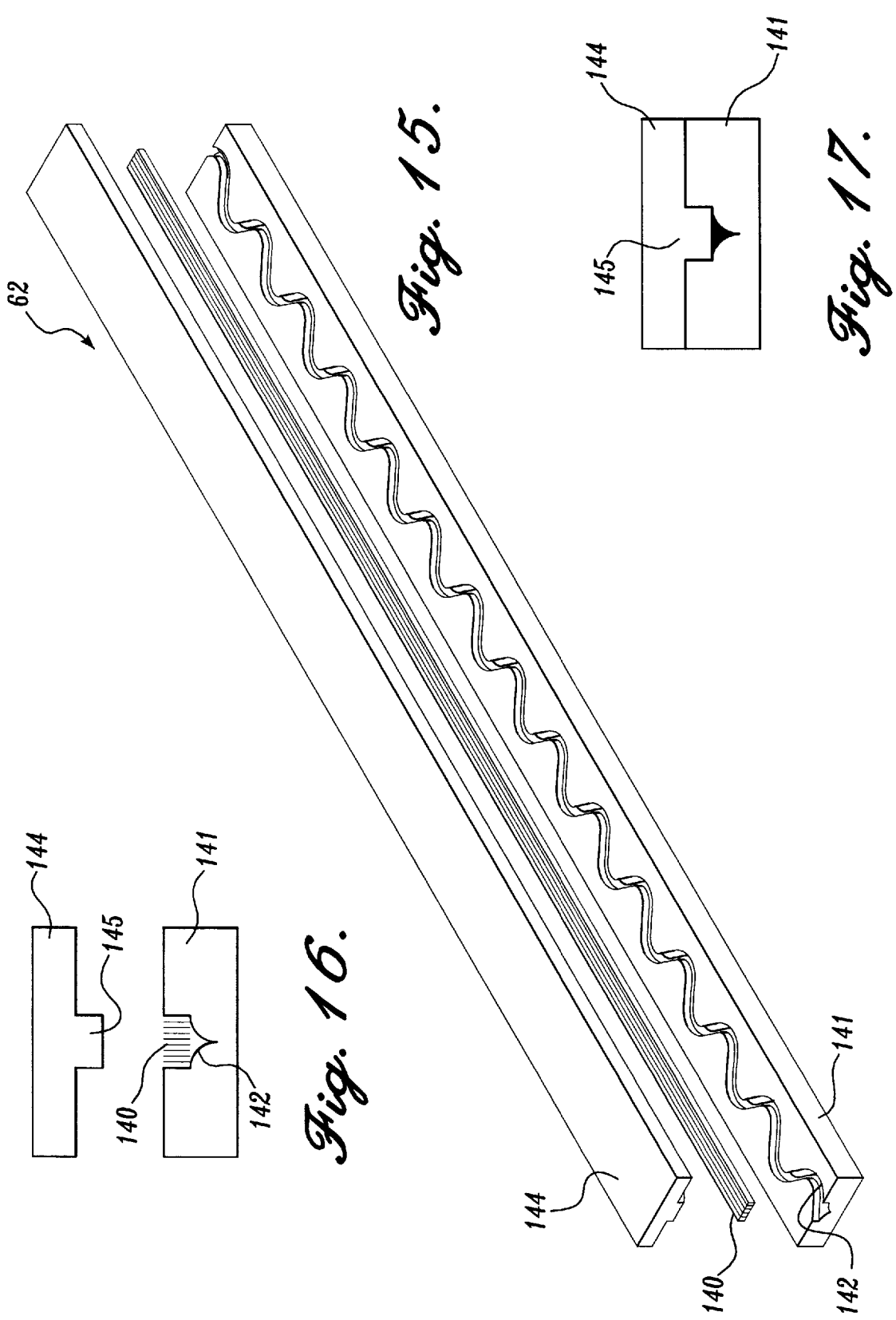

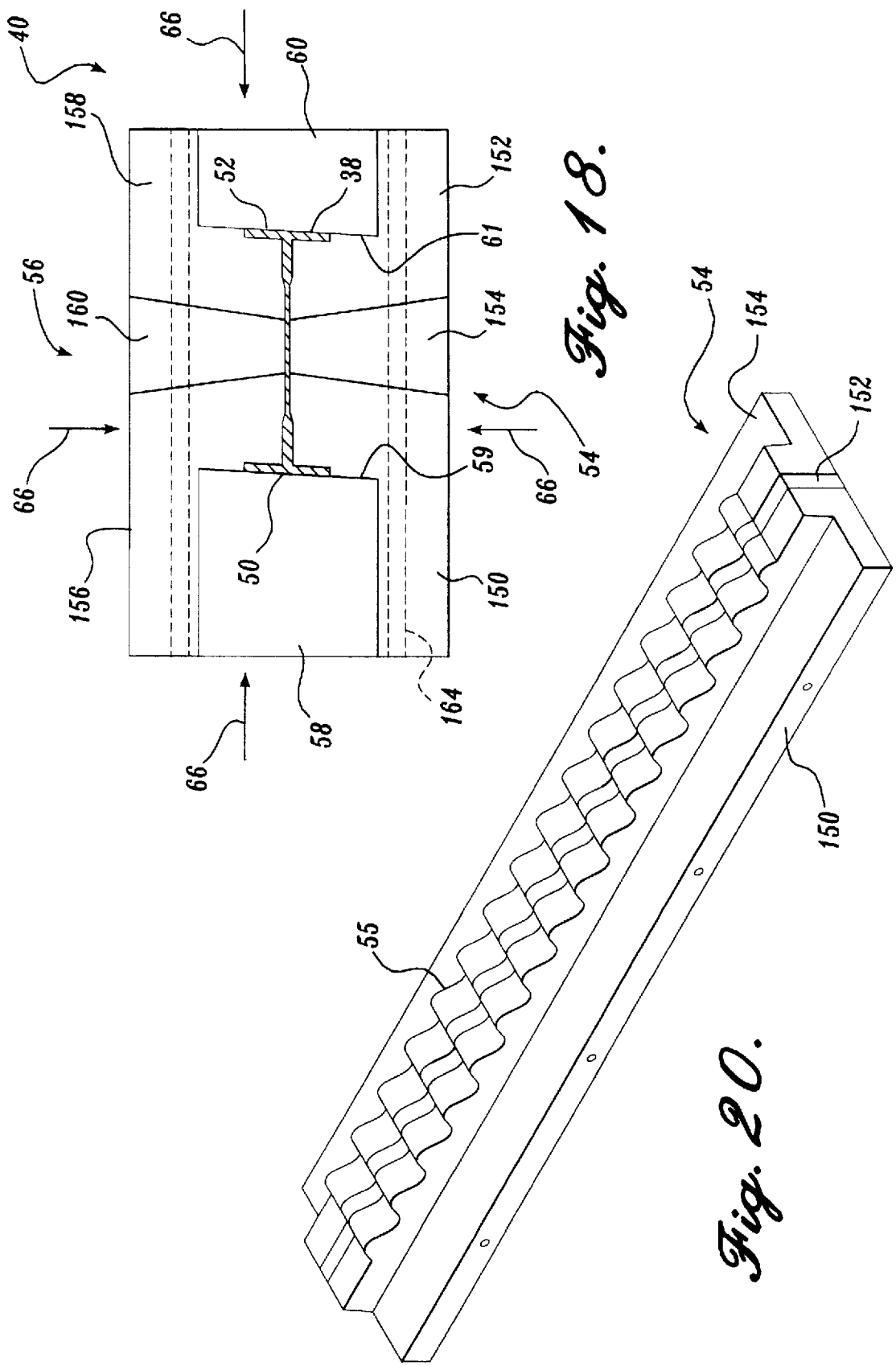

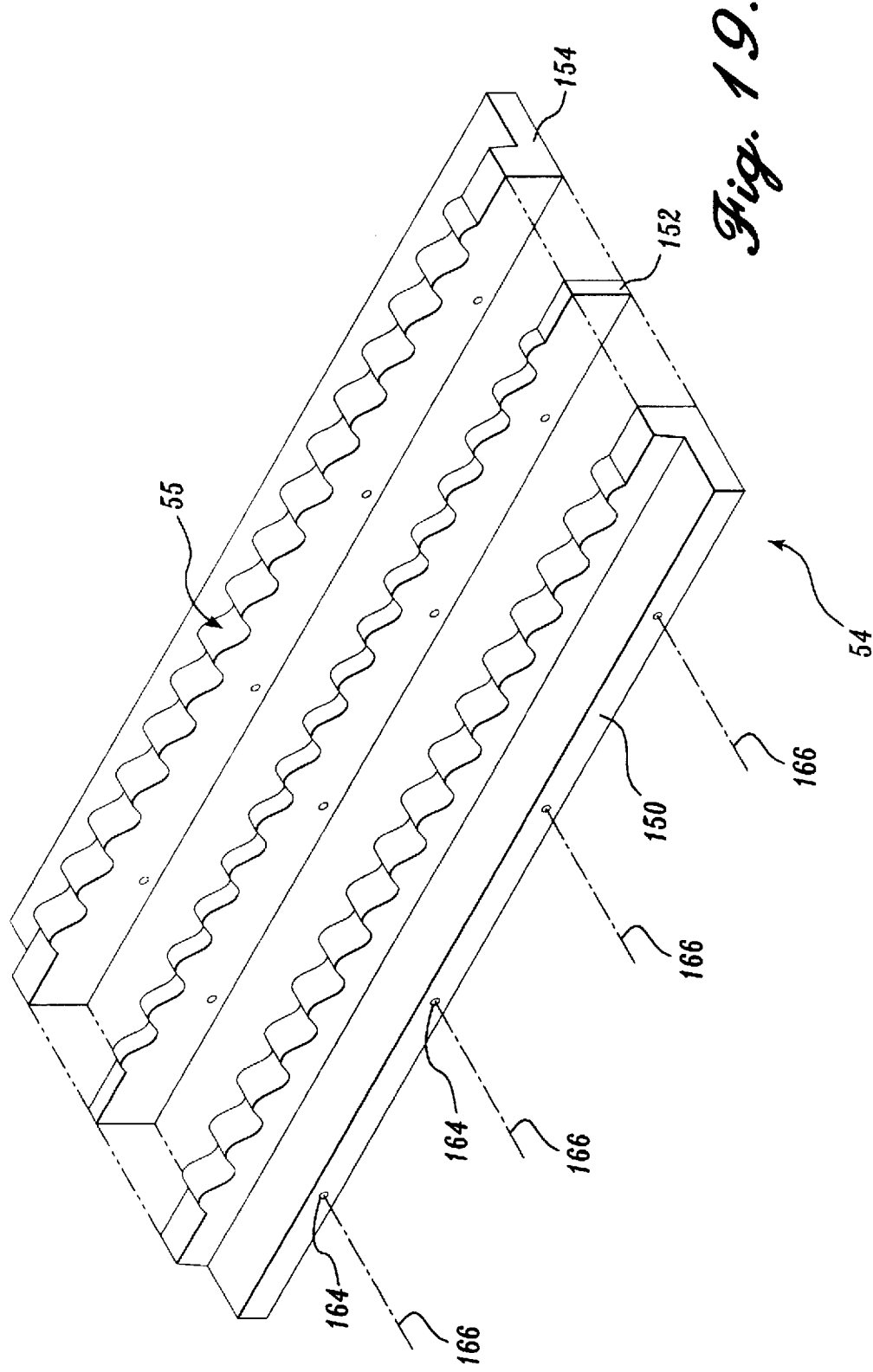

5,843,355

METHOD FOR MOLDING A THERMOPLASTIC COMPOSITE SINE WAVE SPAR STRUCTURE

FIELD OF THE INVENTION

The present invention relates to methods and apparatus for forming composite materials and more particularly to the forming of aircraft structures from thermoplastic composite materials.

BACKGROUND OF THE INVENTION

The use of composite materials in the manufacture of aircraft and other lightweight structures has increased steadily since the introduction of such materials. Composite materials have a high strength-to-weight ratio and high stiffness, making them attractive for use in lightweight aircraft structures. Some drawbacks to using composite materials have been high fabrication costs and low damage tolerance. Generally, it has been difficult to produce parts formed of high-strength composite materials at the same cost as comparable metal parts. It has also generally not been possible to produce composite parts having the same degree of damage tolerance as comparable metal parts. These cost and damage tolerance differences between composite and metal parts are especially notable in large scale parts having complex contours.

Another disadvantage of composite materials has been their relatively low temperature tolerance. The introduction of thermoplastic composite materials has increased the temperature tolerance of composites. In addition to having higher temperature tolerance, thermoplastic composites are impervious to most chemicals and have superior strength in some applications making them ideal candidate materials for advanced aircraft. However, manufacturing difficulties have generally made it difficult, if not impossible, to fabricate complex parts from such thermoplastic composite materials.

One of the contributors to such fabrication difficulty has been the form in which most thermoplastic composite materials are obtained from a material supplier. Generally, thermoplastic composite materials come in rolls of flat material having unidirectional reinforcement fibers embedded within a stiff, polymerized plastic matrix. Such rolls are currently available in widths ranging from approximately a ¼ inch to a foot. The thermoplastic matrix material is in a solid state, thus resulting in a slick flat, nonformable material. The stiffness of the thermoplastic composite material prevents it from being easily bent or formed around complex contours. In addition, even if formed around a contour, the thermoplastic material maintains a memory such that once the forming pressure is released the material returns to its flat shape.

The stiff, nondeformable nature of most prior thermoplastic composite materials have relegated them to use in simple parts having gentle contours such as flat panels, fuselage doors, etc. It would be advantageous if thermoplastic composite materials could be used in highly stressed primary aircraft structure such as ribs and spars. In the past, the complex contours of most aircraft's primary structure has prevented thermoplastic composite materials from being used. Due to the stiff, nondeformable nature of the thermoplastic composite materials, it has generally not been possible or cost-effective to produce high-quality parts having such complex contours. One of the primary aircraft structures that could be advantageously formed from thermoplastic composite materials is sine wave spars for aircraft wing structures.

Aircraft spars can be formed of C-channels, I-beams, or I-beams having sine wave central webs. Sine wave spar configurations have been found to provide superior weight and strength properties in most aircraft structures when compared to other spar shapes. In order to form sine wave spars of thermoplastic composite materials, the thermoplastic composite materials must be formed around complex sine wave contours and sharp radius corners in order to form the web and caps of the spar. Prior art manufacturing techniques have not been able to produce high-quality formed sine wave spars from thermoplastic composite materials.

One method tried to overcome fabrication difficulties with thermoplastic materials is the use of a cloth composite material having a thermoplastic matrix material that is applied to the reinforcing fibers in a powder form. During processing, the thermoplastic matrix material is heated to a temperature at which the matrix material flows together to form a consolidated thermoplastic composite part. However, such cloth materials are expensive, and have been prone to problems associated with fiber wet-out, voids, etc. In addition, the use of cloth materials is not as structurally efficient as the use of unidirectional composite materials.

As can be seen from the discussion above, there exists a need for methods and apparatus to form thermoplastic composite materials into complex shapes such as sine wave spars for use in aircraft applications. The present invention is directed toward meeting this need.

SUMMARY OF THE INVENTION

The present invention is a method of forming a sine wave spar structure from a thermoplastic or other composite material and the sine wave spar structure produced by the method. The present invention allows sine wave spar structures to be produced using unidirectional thermoplastic or other composite prepreg material while reducing the occurrence of wrinkles, folds, etc. in the individual layers of the formed sine wave spar structure.

In accordance with one embodiment of the present invention, a sine wave structure having a sine wave web and at least one flange extending outward from the web is formed of a thermoplastic composite material. Individual layers of thermoplastic composite prepreg material are first cut to form web plies and cap plies. The web plies are then cut to form a plurality of teeth that extend outward from at least one edge of each ply. The cut web plies are placed on and formed to the forming surface of a tool having a sine wave forming surface. After deforming the web plies to the contour of the forming surface, the teeth on the web plies are folded over the edges of the forming surface in the region of the sine wave contour to form one or more flanges. The cap plies are then placed adjacent the flanges and the combination of cap plies and web plies are consolidated to produce the formed sine wave spar structure.

In accordance with other features of the invention, tools are provided having U-shaped forming surfaces. The web plies are formed over the U-shaped forming surfaces and the teeth are formed over the edges of the U-shaped forming surfaces. The teeth are folded over opposing edges of the U-shaped forming surface in the region of the sine wave contour to form opposing flanges, thereby forming a U-shaped channel having a central sine wave web.

In accordance with other aspects of the invention, upper and lower U-shaped channels are formed. Each U-shaped channel includes a central web having a sine wave contour. The upper and lower U-shaped channels are joined so that the central webs of the channels are placed adjacent to each other so that the flanges of the U-shaped channels are in line with each other.

In accordance with yet other aspects of the invention, a triangular shaped radius filler having a sine wave contour is formed from strips of the thermoplastic composite prepreg material. The radius fillers are placed into triangular gaps created between the flanges of the joined upper and lower U-shaped channels.

In accordance with still other aspects of the invention, filler plies are cut from the thermoplastic composite prepreg material. The filler plies include one or more recesses along one edge. The filler plies are placed adjacent the folded over teeth of the web plies so that one or more of the teeth extend into the recesses in the filler plies. Separator plies are also cut from the thermoplastic composite prepreg material. One edge of the separator plies are cut to form a sine wave contour. The separator plies are placed over the folded over teeth and filler plies in order to form a layer of the flanges of the U-shaped channel.

In accordance with yet other aspects of the invention, the dimensions of the teeth on the web plies are determined in order to reduce the formation of gaps between the edges of the teeth after the teeth are folded over the edges of the forming surface. The shape and dimensions of the teeth are also determined to prevent the teeth from overlapping one another after the teeth are folded over the edges of the forming surface. In one embodiment, a plurality of teeth having approximately the same size and shape are used. In other embodiments, the web plies are cut to form at least three different shapes of teeth or at least eight different shapes of teeth.

In accordance with still further aspects of the invention, the teeth of the web ply are folded over the edges of the forming surface in the region of the sine wave contour using a hot iron.

In other embodiments of the invention, the sine wave spar structure may be formed from unidirectional thermoplastic composite prepreg material including PEAK, HTA, K-IIIB, PEKK, Radel-X or Ultem.

The present invention allows sine wave composite I-beam spars to be formed of stiff thermoplastic composite prepreg. The invention's use of web plies having a plurality of teeth allows the web plies to be folded around the edges of a sine wave spar tool without creating excessive wrinkling. Folding the teeth around the edges of the sine wave spar also increases the structural strength between the web of the sine wave spar and the caps of the sine wave spar. High web to cap strengths are particularly important in highly loaded aircraft sine wave spars.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a top view of a thermoplastic composite sine wave spar formed in accordance with the present invention;

FIG. 2 is a side elevational view of the sine wave spar of FIG. 1;

FIG. 3 is an end view of the sine wave spar of FIG. 1;

FIG. 5 is a partially exploded view showing the assembly of the upper and lower C-channels;

FIG. 6 is a partially exploded view of the upper and lower C-channels, radius fillers, and cap plies;

FIG. 9 is a perspective view of another embodiment of the forming of a portion of a web ply around a sine wave contour;

FIG. 10 is a side elevational view showing the preferred embodiment of the forming of a portion of a web ply around a sine wave contour;

FIG. 11 is a top view illustrating one embodiment of a web ply, cap filler ply, cap separator ply, and cap ply;

FIG. 12 is an enlarged view of a portion of the web ply of FIG. 11;

FIG. 15 is a perspective view of the radius filler tooling and radius filler workpiece;

FIG. 16 is an end view of the radius filler tooling in an open position;

FIG. 17 is an end view of the radius filler tooling in a closed position;

FIG. 18 is an end view of the preferred embodiment of the sine wave spar tooling;

FIG. 19 is an exploded view of the lower tooling;

FIG. 20 is a perspective view of the assembled lower tooling;

DETAILED DESCRIPTION OF THE PREFERRED EMBODIMENT

Figure 4:
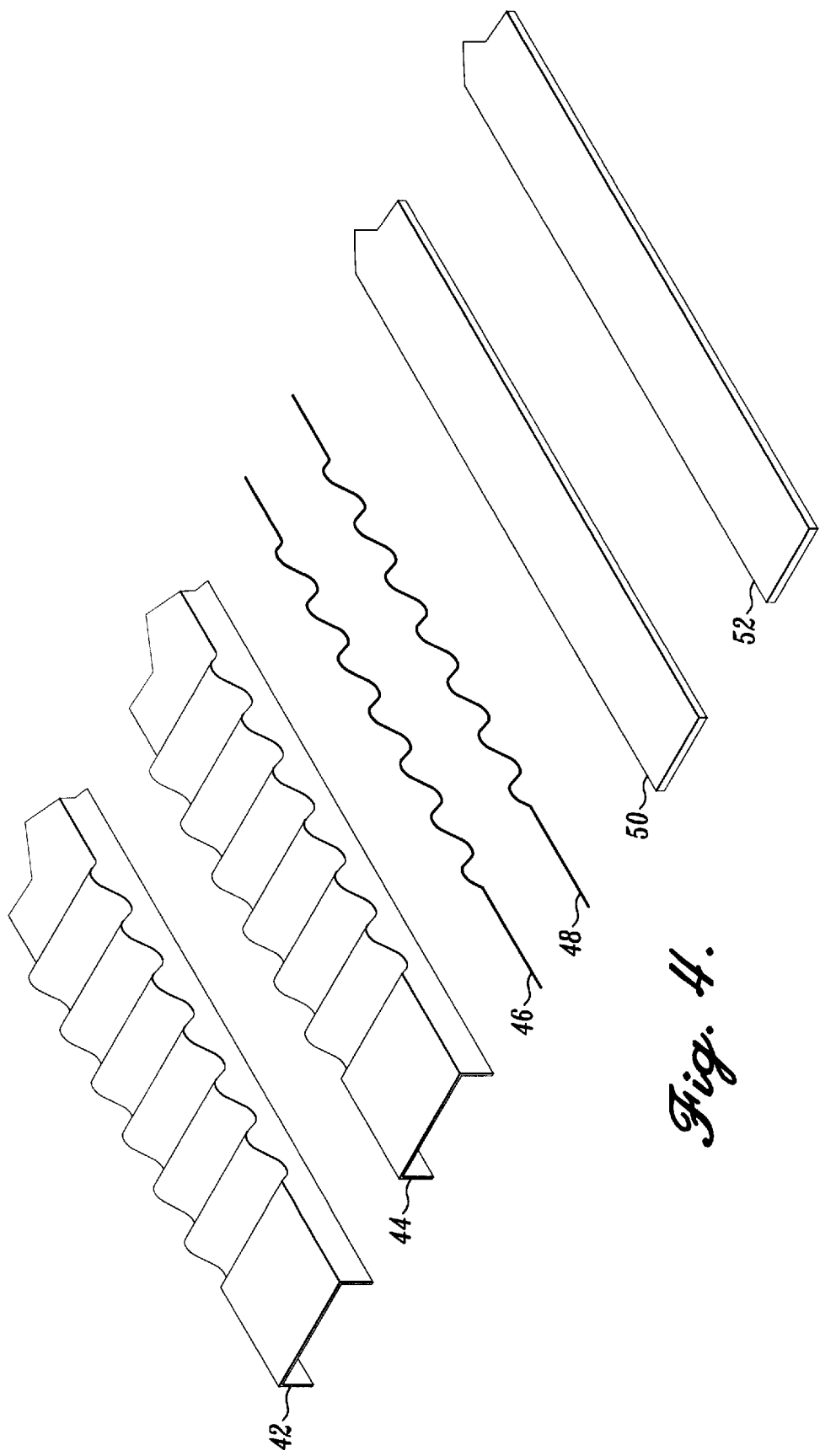
FIG. 4 is an exploded view showing a portion of the individual composite subassemblies that form the composite sine wave spar.

The present invention is a method and apparatus to form composite parts from prepreg composite materials. The invention is described below with respect to a preferred embodiment used to form a sine wave spar 30 from an unidirectional thermoplastic composite material. However, the method and apparatus of the invention may be used to form a variety of composite structures. Similarly, the present invention may be used to form composite parts out of various composite materials including fiber reinforced epoxy matrix composite prepreg, bismaleimide matrix composite prepreg, or thermoplastic matrix composite materials such as K-IIIB, PEEK, HTA, PEKK, Radel-X or Ultem, etc. The composite prepreg used can be reinforced with unidirectional fibers, such as fiberglass, graphite, or Kevlar®fibers. The use of unidirectional composite prepreg can also be combined with the use of cloth prepreg composite materials to form the composite part.

FIG. 1 illustrates a sine wave spar 30 fabricated according to a method of the present invention as described below. As best illustrated in FIGS. 1–3, the sine wave spar 30 is generally an I-beam having a central sine wave web 32 that extends between opposing spar caps 34 and 36, respectively. The spar caps 34 and 36 are inclined at an angle with respect to the sine wave web 32 such that the leading edges 31 of the caps are closer together than the trailing edges 33 (FIG. 3).

For clarity, an overview of the method of forming the composite sine wave spar 30 will first be discussed below. The individual forming steps and associated tooling etc., will then be discussed in more detail.

In the preferred embodiment, the sine wave spar 30 is fabricated using several preformed composite subassemblies that are joined together in an assembly process to form an unconsolidated formed composite workpiece 38 (FIG. 6). The formed composite workpiece 38 is then placed within a sine wave tooling concept 40 FIG. 18). The workpiece 38 and tooling concept 40 are then vacuum bagged and placed within an autoclave (not shown) where the composite workpiece is formed under a vacuum and a high pressure consolidation force at an elevated temperature.

Although the preferred embodiment of the invention is described below with respect to the use of an autoclave, the invention could be used with other fabrication equipment. For example, the present invention could be used along with a heated forming press or within a forming press using tools having an integrated heat source such as cal rods, induction heaters, etc.

As discussed in the background section, unidirectional thermoplastic composite materials are generally available as rolls of prepreg having a maximum width of approximately one foot. Therefore, in order to form larger parts, the relatively narrow one-foot wide prepreg materials are first seamed together to form wider sheets of material. Once seamed, the sheets of composite prepreg material are cut to the desired dimensions using a water jet cutter, Gerber cutter, or other appropriate cutting device. These individual cut-out layers or plies of thermoplastic composite material are then formed to the desired shapes and tacked together or, in some instances, preconsolidated to form the subassemblies that are used to form the composite workpiece 38 as described below.

In the preferred embodiment, the composite workpiece 38 is assembled from preformed composite subassemblies including lower and upper U-shaped channels 42 and 44 (a portion of which is shown in FIG. 4), left and right radius fillers 46 and 48, and left and right caps 50 and 52. The lower and upper U-shaped channels 42 and 44 are formed by laying the cut out individual layers of unidirectional composite prepreg over the sine wave forming surfaces 55 and 57 of lower and upper tools 54 and 56, respectively (FIGS. 20 and 21), and then tacking or taping them together, as described in detail below.

Figure 21:
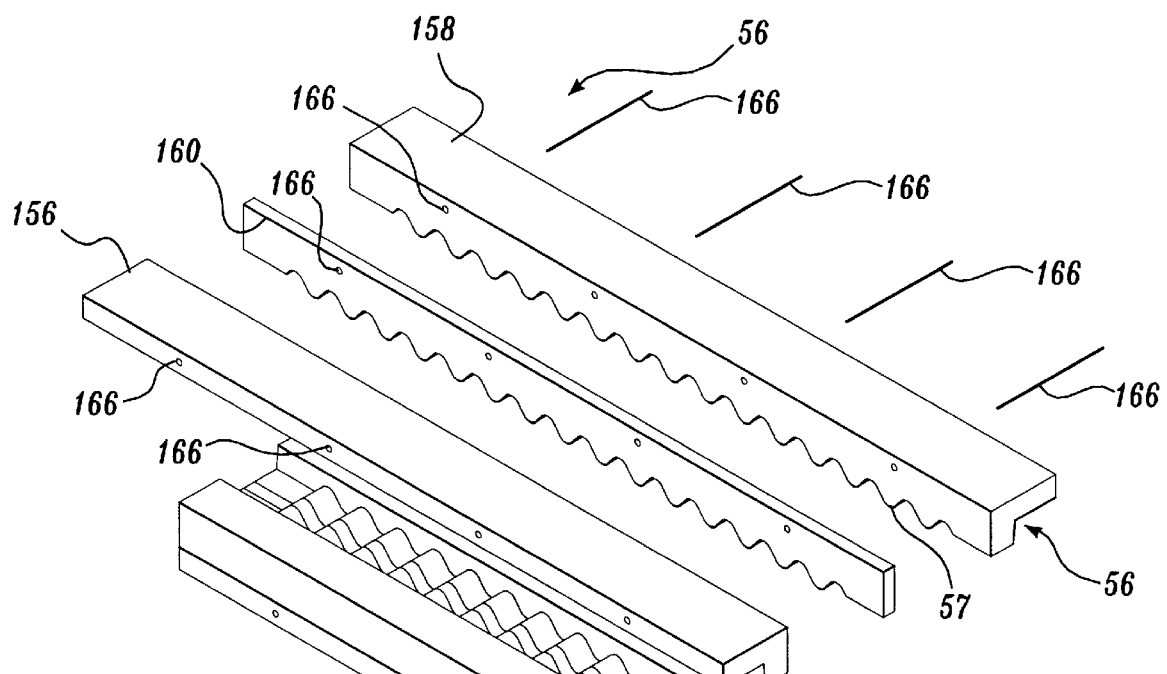
FIG. 21 is a partially exploded view of the sine wave spar tooling.

The left and right caps 50 and 52 are formed by laying cut out individual layers of unidirectional composite prepreg material over the forming surfaces 59 and 61 of left and right cap tools 58 and 60, respectively (FIGS. 18 and 21). The laid-up left and right caps 50 and 52 are then tacked together and preconsolidated in order to simplify the assembly of the composite workpiece 38, as described below.

The left and right radius fillers 46 and 48 are formed of individual strips of thermoplastic composite prepreg that are stacked side-by-side to form a blank 140 as illustrated in FIGS. 15 and 16. The blank 140 is placed within the forming cavity 142 of a radius filler tool 62. The blank 140 is then preconsolidated into a sine wave shape using the radius filler tool 62 as described in more detail below. After consolidation, the left and right radius fillers 46 and 48 have the correct sine wave shape to fit between the assembled lower and upper U-channels 42 and 44 (FIG. 5), as described below.

After the lower and upper U-shaped channels 42 and 44 are fabricated out of individual layers of prepreg, they are placed together as illustrated in FIG. 5. The lower and upper U-shaped channels 42 and 44 are placed together so that the sine wave contours of the channels fit together and so that the flanges 63 (FIG. 5) on the lower U-shaped channel 42 are aligned with the flanges 65 on the upper U-shaped channel as illustrated in FIG. 6. Once assembled, the lower and upper U-shaped channels 42 and 44 may either be held together by clamps or tape or may be tacked together using a heat iron, heat gun, etc. Due to the rounded edges on the corners of the lower and upper U-shaped channels 42 and 44, a triangular gap 134 (FIG. 14) is formed along both edges of the intersection between the joined surfaces of the U-shaped channels.

The triangular gaps 134 are filled using the left and right radius fillers 46 and 48. The radius fillers 46 and 48 are placed in the triangular gaps 134 and tacked in place using a heat gun, hot iron, tape, etc., as illustrated in FIG. 6. After the radius fillers 46 and 48 are in place, the preconsolidated left and right caps 50 and 52 are placed in contact with the joined flanges 63 and 65 of the U-shaped channels 42 and 44 as best seen in FIG. 6, thus forming the composite workpiece 38 (FIG. 18).

The formed composite workpiece 38 is then placed within the tooling concept 40 and consolidated. The preferred embodiment of the tooling concept 40 includes upper tools 56, lower tools 54, and left and right cap tools 58 and 60, as illustrated in FIG. 18. As described in more detail below, in order to avoid trapping the tools within the formed composite sine wave spar 30, the lower tools 54 are formed of three pieces namely, a left tool 150, a right tool 152, and a center tool 154. Similarly, the upper tools 56 are formed of a left tool 156, a right tool 158 and a center tool 160.

The upper and lower tools 56 and 54 and left and right cap tools 58 and 60 fit together around the composite workpiece 38 in order to define the part geometry of the formed sine wave spar 30 as described in more detail below. The combined assembly comprising the composite workpiece 38 and tooling concept 40 is placed within a vacuum-bag (not shown) and then placed within an autoclave and processed.

The interior of the vacuum bag is connected to the autoclave's vacuum exhaust (not shown) in order to remove any air within the vacuum bag and any volatiles produced during consolidation of the composite workpiece 38. During processing, the autoclave is pressurized to apply an inwardly directed force on the tooling concept 40 as illustrated by arrows 66 in FIG. 18. This inward directed force places a consolidation pressure on the various surfaces of the composite workpiece 38. At the same time, the tooling concept 40 and composite workpiece 38 are heated in accordance with the processing requirements of the composite material used. The combination of the elevated temperature and consolidation force applied to the composite workpiece 38 consolidates and forms the composite workpiece to the interior dimensions of the tooling concept 40, thus producing a formed composite sine wave spar 30.

In the preferred embodiment, the sine wave spar 30 is formed of HTA/IM8 thermoplastic composite material. For this material, the processing cycle shown in FIG. 23 was used to produce a high quality formed composite part. The composite tooling concept 40 and composite workpiece 38 were heated to 710° F. over approximately 480 minutes.

During the heating of the tooling concept and composite workpiece, a 10–15 psi vacuum was applied to the interior of the vacuum bag and held during processing. When the temperature of the composite workpiece 38 reached approximately 650° F. in approximately 300 minutes, a consolidation pressure of 200 psi was applied and held until the composite workpiece reached the 100° F. temperature. After consolidation, the temperature of the composite workpiece 38 was reduced and the formed composite part was removed at approximately 700° F.

Figure 23:
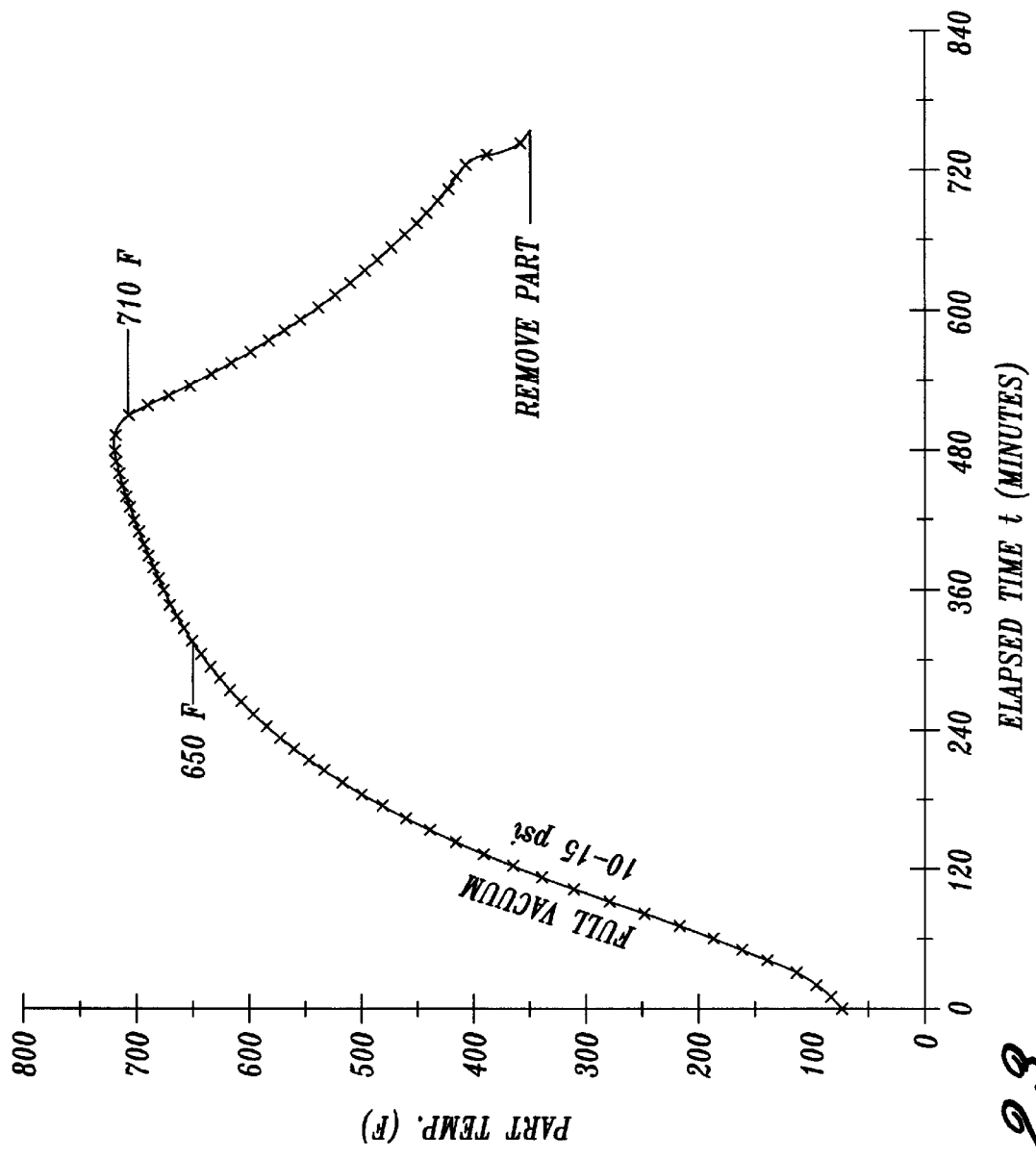
FIG. 23 is a graph of elapsed time versus part temperature wherein elapsed time is plotted along the x-axis and part temperature is plotted along the y-axis.

The processing parameters illustrated in FIG. 23 produced a high quality part using the material system identified for the preferred embodiment. However, other composite material systems could require different processing parameters in order to produce the best quality part. A range of processing parameters capable of producing high quality parts is generally provided by the supplier of the material used. In addition to the material selected, the thicknesses of the composite workpiece 38 and the thermal mass of the composite tooling concept 40 also affect the optimization of the processing parameters.

The process by which the individual subassemblies used to form the composite workpiece 38 are formed will now be described in more detail. As discussed in the background section, one of the difficulties in forming parts from unidirectional thermoplastic composite materials is their stiff, cardboard-like nature that prevents them from being easily formed around complex contours. Thus, although thermoplastic composite materials have been successfully used to form simple structures such as U-shaped I-beams, curved wing or fuselage panels, etc., they have not generally been successfully used to form more complex structures such as aircraft sine wave spars.

One of the difficulties in fabricating the composite sine wave spar 30 is to form the individual layers of thermoplastic composite prepreg around the sine wave spar tools without creating puckering, wrinkling, etc. Another difficulty is to form individual layers of thermoplastic composite around the sine wave spar tooling so that the individual layers maintain their shape so that additional layers may be formed over the top of the formed layers.

In order to form sine wave spars out of thermoplastic composite materials, the layers of composite material are formed around complex sine wave contours. In the invention, a lay-up configuration is used that allows the individual layers of thermoplastic composite material to be formed around complex sine wave contours without creating undesirable wrinkles in the composite material. During development of the preferred lay-up configuration, different ply configurations were developed and used with varying degrees of success.

Figure 7:
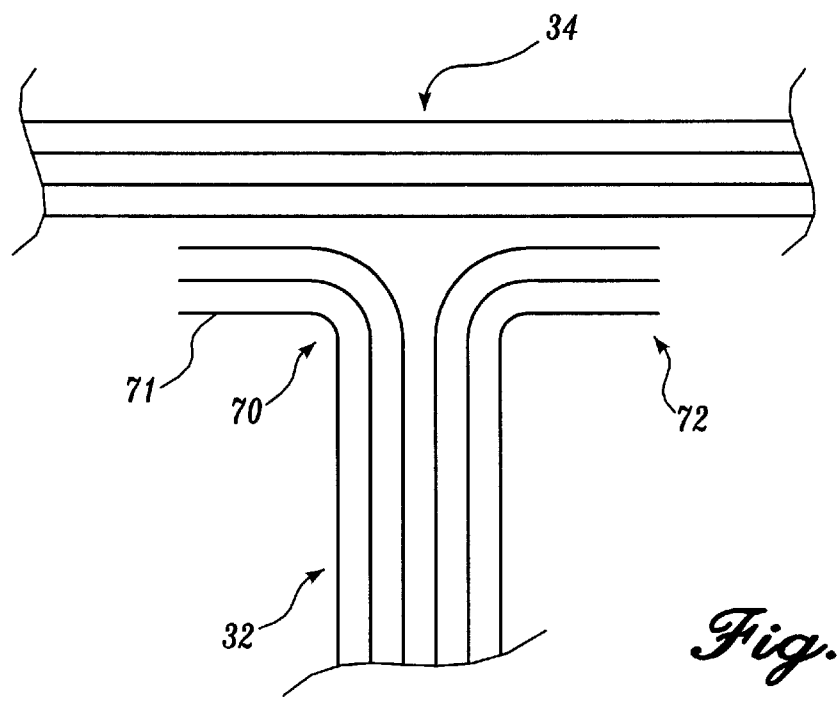
FIG. 7 is a cross-section showing a portion of a ply configuration for one embodiment of a sine wave spar formed in accordance with the present invention.
Figure 8:
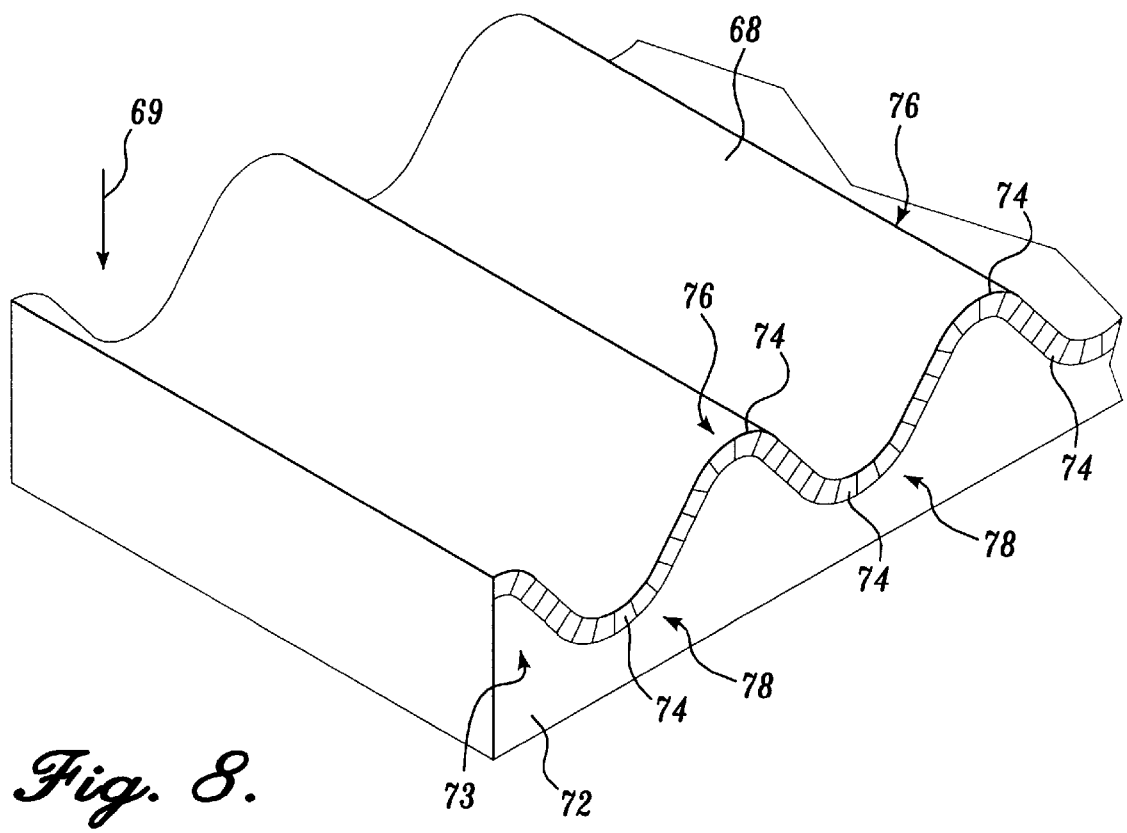
FIG. 8 is a perspective view of one embodiment of the forming of a portion of a web ply around a sine wave contour.

A first embodiment of a ply configuration used to form the sine wave spar 30 is illustrated in FIGS. 7 and 8. In the first embodiment, several layers of prepreg composite material are used to form the web 32 of the sine wave spar 30 and additional layers of prepreg composite material are used to form the caps 34 and 36 of the composite sine wave spar. In order to obtain sufficient strength to carry loads from the web 32 into the caps 34 and 36, each layer of prepreg composite material used to form the web 32 is folded through a 90° bend 70 (FIG. 7). This allows the outer portion 71 of each layer of composite material forming the web 32 to form a flange 73 lying adjacent to the interior surface of the respective cap 34 or 36. Thus, in the preferred embodiment, the lower and upper U-shaped channels 42 and 44 are formed so that they include the respective flanges 63 and 65.

For ease of description, the fabrication of only a portion of a representative lower or upper U-shaped channels 42 or 44 is described below. The fabrication is described with respect to a representative forming tool 72 that has a representative sine wave forming surface. In actual application, the individual layers of composite material forming the lower and upper U-shaped channels 42 and 44 are formed over the forming surfaces 59 and 61 (FIGS. 20 and 21) of the lower and upper forming tools 54 and 56, respectively.

As illustrated in FIG. 8, in order to form the flanges 73, each layer of prepreg composite material forming the web 32 is formed over the forming surface of the forming tool 72. The individual layers of composite material 68 are first pressed downward as illustrated by arrow 69 so that the layer of material conforms to the sine wave contour. The edges of each layer 68 are then folded over the edges of the tools 72 as described below.

In the first configuration shown in FIG. 8, the edges of each layer 68 of prepreg composite are slit at equally spaced intervals and to the same depth in order to form rectangular tabs or teeth 74. The teeth 74 are formed by slitting the prepreg composite material perpendicularly to the edges of the material as shown in FIG. 8. The slits allow each of the teeth 74 to be individually folded over the edge of the tool 72. Due to the stiff nature of the prepreg composite, each of the teeth 74 are folded over by locally heating the layer 68 of prepreg composite material to an elevated temperature at which the viscosity of the material allows the material to be bent over the edges of the tool 72. In the preferred embodiment, the teeth 74 are folded over using a hot iron operating at approximately the melting temperature of the thermal plastic matrix in the composite material.

As illustrated in FIG. 8, in the first configuration, the teeth 74 are formed of equal sizes and lengths. The slits along the edges of the layer 68 of composite prepreg allow the teeth 74 and thus layer of prepreg to be conformed to the sine wave contour of the tool 72. However, because the teeth 74 are similarly sized, the teeth overlap at the peaks 76 of the sine wave contour and leave gaps (not shown) between the individual teeth in the valleys 78 of the sine wave contour.

After each layer 68 of prepreg used to form the web 32 is applied to the tool 72 and formed around the edges of the tool, the layers are joined together to form the upper or lower U-shaped channels as shown in FIGS. 5 and 6. The U-shaped channels 42 and 44 are joined by tacking the individual layers of prepreg together using a hot iron or by taping them together. If tacking is used, a hot iron is briefly placed on the composite material at spaced intervals over the length and width of the layers of composite material. The hot iron locally heats and melts the matrix material in the layers of composite material, thus locally joining them together.

After the U-shaped channels 42 and 44 are joined together, the radius fillers 46 and 48 are placed in the triangular gaps 134 between the channels. The preconsolidated caps 50 and 52 are then placed adjacent the flanges formed by the folded-over teeth 74 of the web plies as described above and as shown in FIG. 7. The resulting composite workpiece 38 is then placed within the tooling concept 40, vacuum bagged and cured as discussed above to produce the sine wave spar 30.

The first ply configuration produced a void-free, reasonable quality sine wave spar that was aesthetically acceptable. Upon testing the resulting sine wave spar 30, it was found that there was insufficient strength between the web 32 and the caps 34 and 36 for application to highly stressed aircraft spars requiring high strength between the web and the caps. However, the sine wave spar 30 produced using the first ply configuration can be used for other applications in which the strength between the web 32 and caps 34 and 36 need not be as high.

Using the information learned from the first ply configuration illustrated in FIG. 8, a second ply configuration was created as illustrated in FIG. 9. The same general idea used in the first ply configuration was carried over to the second ply configuration, i.e., the edges of each layer 68 of composite material used to form the web 32 were slit to form teeth that can be folded over the edges of the sine wave contour of the tool 72. However, in the second ply configuration the teeth were not maintained at a constant size or shape. As illustrated in FIG. 9, the edges of each layer of thermoplastic composite material 68 were cut to form four different teeth configurations. The portion of each layer of composite material located in the valleys 78 is slit perpendicular to the edge of the material to form three equally sized rectangular teeth 80. The portions of the composite material placed along the relatively flat sides 82 of the sine wave contour is slit perpendicular to the edge of the material to form larger left and right teeth 84 and 86 respectively. The outer edges of each of the teeth 84 and 86 are cut at a slant so that the edge of each tooth closest to a tooth 80 is longer than the opposite edge of the respective tooth. The portion of the composite material 68 located at the peaks 76 of the sine wave contour is slit at an angle to form four triangular teeth 88. The triangular teeth 88 are tapered to a point at their outermost edge.

After slitting the edges of the composite material 68 to form the teeth 80, 84, 86 and 88, the composite material is pressed into the sine wave contour of the tool 72 as shown in FIG. 9. The teeth 80, 84, 86 and 88 are then folded over the edges of the sine wave contour using a heat iron as described above. The rectangular teeth 80 fold over the edge of the sine wave contour in the region of the valley 78. After the rectangular teeth 80 are folded over, a triangular gap 89 is left between the edges of each of the rectangular teeth 80. The larger teeth 84 and 86 fold over so that they extend downward and inward from the sides 82 (FIG. 9). The length of the teeth 84 and 86 and the angle at which the outer edges of the teeth 84 and 86 are cut is determined so that the outer edges of the teeth 84 and 86 lie adjacent each other once the teeth 84 and 86 are folded over. The teeth 88 are cut at angles so that the edges of one of the teeth 88 lie adjacent the edges of the adjoining teeth once the teeth are folded over the sine wave contour in the region of the peak 76.

In a manner similar to that described above with respect to the first ply configuration, after each individual layer of composite material is placed and conformed to the sine wave contours of the tools they are tacked together to form the upper and lower U-shaped channels 42 and 44. The channels 42 and 44 are then joined as described above. The radius fillers 44 and 48 are then placed in the triangular gaps 134 between the joined U-shaped channels and the caps 50 and 52 are applied to form the composite workpiece 38. The composite workpiece 38 is then placed within the tooling concept 40 and cured according to the processing parameters of the material as described above.

The second ply configuration produced a high quality thermoplastic composite sine wave spar 30 relatively free of voids etc. The second ply configuration also resulted in improved strength between the web 32 and caps 34 and 36 of the sine wave spar. This increased strength is primarily due to the increased size of the flanges produced using the second ply configuration. However, the second ply configuration still lacked sufficient strength between the web 32 and caps 34 and 36 of the resulting sine wave spar for highly loaded aircraft configurations. In addition, the second ply configuration created fiber directional discontinuities and inefficiencies in the resulting sine wave spar. When a layer of composite material having reinforcing fibers oriented at either plus or minus 45° is used in the second ply configuration, the fiber orientation in the location of the left and right teeth 84 and 86 became 0° and 90°. The different fiber orientations in the left and right teeth 84 and 86 changes the strength and stiffness of the layer of composite material in the area of the left and right teeth 84 and 86. Thus, the second ply configuration results in load discontinuities in the area of the left and right teeth 84 and 86 due to the changing fiber orientations.

The lessons learned from the first and second ply configurations were used to create the preferred ply configuration illustrated in FIGS. 10–14. In the preferred ply configuration, one of the goals was to improve the peel strength between the web 32 of the sine wave spar 30 and the caps 34 and 36 of the sine wave spar. Another goal was to minimize any load discontinuities by maintaining consistent fiber orientation wherever possible.

In the preferred ply configuration, the sine wave spar 30 is formed using four different basic ply configurations, i.e., web plies 118 (FIG. 11), filler plies 120, separator plies 128, and cap plies 132. The web plies 118 are used to form the web 32 of the sine wave spar and to fold over around the edges of the tooling to form part of the caps 34 and 36. The filler plies 120 are configured to intermesh with the folded over portions of the web plies 118 to form a continuous layer of composite material throughout the caps 34 and 36. The separator plies 128 are placed between selected layers of filler plies 120 in order to further reinforce the caps 32 and 34. The cap plies 132 are placed on the exterior of the partially formed caps 34 and 36 and extend the width and length of the caps to provide additional reinforcement. The configuration and use of the web plies 118, filler plies 120, separator plies 128 and cap plies 132 are discussed in more detail below.

Figure 14:
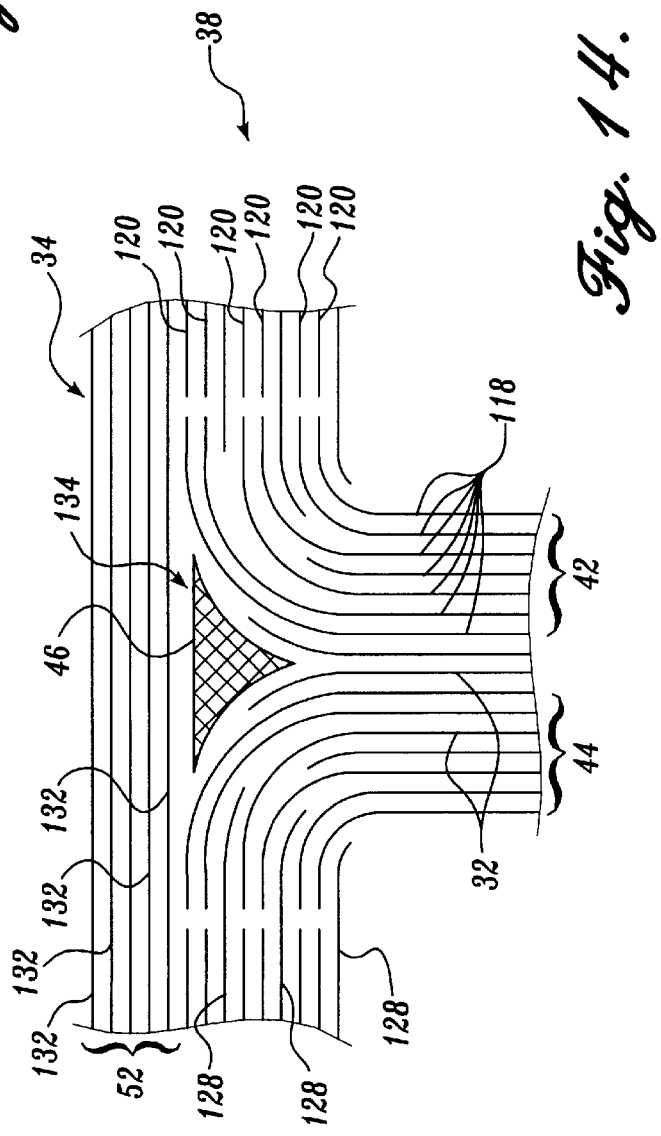
FIG. 14 is a cross-section of a portion of the preferred ply configuration according to the invention.

First, the upper and lower U-shaped channels 42 and 44 (FIG. 4) are formed using the web plies 118, filler plies 120 and separator plies 128. The individual U-shaped channels 42 and 44 are formed by first pressing and forming individual web plies 118 to the sine wave contour of the respective upper or lower tools 54 or 56. An example of the forming process is shown on the exemplary tool 72 in FIG. 10. The teeth (discussed in more detail below) extending from the edges of each web ply 118 are folded over the edges of the tool to form a portion of the flanges on the respective U-shaped channel 42 or 44 (FIG. 19). A filler ply 120 is then placed in contact with the folded over teeth forming a portion of the flanges to extend the individual layer of composite material so that a single layer of composite material extends over the web 32 and around the edges of the tool to form one layer of the flange as best seen in FIGS. 10 and 14. Periodically, separator plies 128 are placed over the folded over teeth of the web plies 118 and over the filler plies 120 to reinforce the flanges of upper or lower channels 42 or 44.

After all of the web plies 118, filler plies 120 and separator plies 128 are in place, they are tacked together or taped together to form the respective left and right U-shaped channels 42 and 44. The lower and upper U-shaped channels 42 and 44 are then placed together and the left and right radius fillers 46 and 48 (FIG. 6) are put in place. The preconsolidated cap plies 132 are then placed over the top of the flanges formed by the left and right U-shaped channels in order to reinforce and complete the caps as described-above.

In the preferred embodiment, the edges of each web ply 118 are cut to form six different configurations of teeth as best illustrated in FIGS. 10 and 12. Starting at the location on the web plies 118 that is to be placed in the center of the valley 78 (FIG. 10) of the sine wave contour, a rectangular tooth 90 is formed. Each rectangular tooth 90 is formed by making two parallel cuts perpendicular to the edges of the web ply 118. When placed on the tool 72 and folded over the edge of the tool, the rectangular tooth 90 extends perpendicular to the edge 113 (FIG. 10) of the flanges of the respective U-shaped channel being formed. Each tooth 90 is cut to a prespecified length so that it extends only partially across the width of the flange as described in more detail below.

The composite material to the left and right of each rectangular tooth 90 is cut to form left and right trapezoidal teeth 92 and 94 as best seen in FIG. 12. The left and right trapezoidal teeth 92 and 94 are reflections of each other around the centerline of the rectangular tooth 90. The edges of the right and left teeth 92 and 94 furthest away from the rectangular tooth 90 extend perpendicular to the edge of the web ply 118. The outer edges 98 of the teeth 92 and 94 slope inward from the edges of the teeth furthest from the rectangular tooth 90 toward the rectangular tooth 90 as illustrated in FIG. 12. The angle at which the outer edges 94 of the teeth slope is determined so that the outer edges extend parallel to the outer edge 113 (FIG. 10) of the flange once the left and right trapezoidal teeth 92 and 94 are folded over the edges of the tool 72.

An elongated trapezoidal tooth 102 is formed to the left of each left tooth 92. The length of each trapezoidal tooth 102 is sized so that it extends approximately over the length of the sides 82 (FIG. 10) of the sine wave contour once folded over the edges of the tool 72. The opposing edges of the trapezoidal tooth 102 are formed by cutting the web ply 118 perpendicular to its edges as illustrated in FIG. 12. The outer edge 104 of the trapezoidal tooth 102 is cut so that the edge of the trapezoidal tooth adjacent the left tooth 92 is longer than the opposite edge of the trapezoidal tooth thus creating a slanted outer edge 104.

To the left of each trapezoidal tooth 102 is a left and a right peak tooth 106 and 108 and a center peak tooth 110. The opposing edges of the center peak tooth 110 slope inward from bottom to top such that the width of the outer portion of the tooth is narrower than the width of the inner portion of the tooth. The outer edge 111 (FIG. 12) of the center tooth 110 lies parallel to the edge 113 (FIG. 10 of the flange of the respective upper or lower U-shaped channels once it is folded over the edge of the tool 72.) The left and right 106 and 108 peak teeth are located to the left and right respectively of the center tooth 110 and are mirror images of each other about the centerline of the peak tooth 110. The edges of the left and right peak teeth 106 and 108 closest to the center peak tooth 110 slant away from the center tooth 110. The opposite edges of the left and right peak teeth 106 and 108 slant inward and downward so that once the left, right and center 106, 108 and 110 peak teeth are folded over the edge of the tool 72 in the location of a peak 76, their edges fit together to cover the peak as illustrated in FIG. 10.

Figure 13:
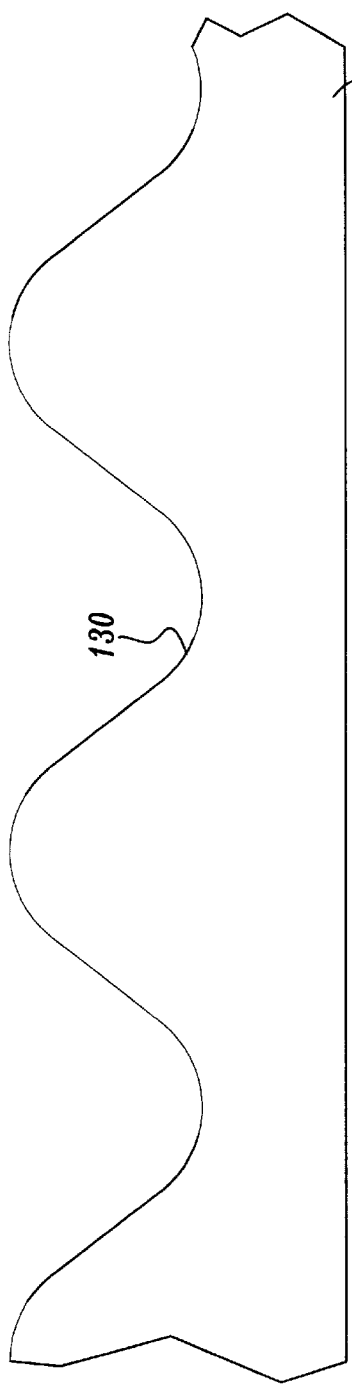
FIG. 13 is an enlarged view of a portion of the separator ply of FIG. 11.

A large fold-over tooth or flap 112 is located immediately to the left of the left peak tooth 106. The tab 112 extends perpendicularly outward from the edge of the web ply 118. The tab 112 then slants from left to right as illustrated in FIG. 13 (or right to left as illustrated in FIG. 11 depending upon the edge of the web ply). The width of the fold-over tab 12 is sized so that it is approximately the same length as the side 82 (FIG. 10) of the sine wave contour of the tool 72.

Once folded over the edge of the tool 72, the slanted edge 115 (FIG. 12) of the tab 112 extends parallel to the edge 113 of the flange and is in line with the outer edges of the left and right trapezoidal teeth 92 and 94 as best seen in FIG. 10. The end 119 of the tab 112 is angled so that once the tab 112 and the trapezoidal tooth 102 are folded over the opposing edges of a sine wave curve in the tool 72, the edge 119 of the tab 112 lies adjacent the edge 104 of the tab 102.

As shown in FIG. 10, once the teeth of the web ply 118 are folded over the edges of the sine wave contour of the tool 72, the teeth 106, 108 and 110 cover the peak 76 of the tool. The tab 112 and trapezoidal teeth 104 cover the mid-section of each sine wave contour and the left and right trapezoidal teeth 92 and 94 and center teeth 90 cover the valley of the edge of the sine wave tool 72.

One goal of the preferred ply configuration is to have the various teeth fit together to cover as much of the edge of the sine wave tool as possible without leaving gaps (FIG. 10) between teeth. In the preferred embodiment, the configuration of the teeth on the web plies 118 leaves small triangular gaps 116 between the edges of the trapezoidal teeth 102 and the left trapezoidal teeth 92 and the edges of the right trapezoidal teeth 94 and the tabs 12. In addition, small rectangular gaps 117 are left between the edges of the left teeth 92 and the rectangular teeth 100 and the edges of the rectangular teeth 100 and the right teeth 94.

As illustrated in FIG. 10, to form a constant thickness cap for the sine wave spar 30 additional composite material is added in the cap adjacent to the folded over teeth of the web plies 118 using the filler plies 120. Each filler ply 120 (FIGS. 11, 12 and 15) includes a plurality of rectangular cutouts 122 (FIG. 11). Each of the cutouts 122 is sized and configured to allow each filler ply 120 to interlock with the folded over rectangular teeth 90 of each web ply 118. As illustrated in FIG. 10, when in position, the center teeth 90 fit into the recesses 122 in the filler ply 120 and the inner edge 124 of the filler ply 120 contacts the edges 114, and 98 of the tab 112 and teeth 92 and 94. The filler ply 120 completes each of the fold-over web plies 118 so that a continuous layer of composite prepreg material extends along the surface of the web 32, around the corner of the tool 72 and over the width of the cap.

In the preferred embodiment, in order to add additional strength to the caps a separator ply 128 is placed between every two filler plies 120. As illustrated in FIG. 13, each of the separator plies 128 has a sine wave edge 130 that is contoured to follow the contours of the sine wave surface of the respective upper and lower U-shaped channels 44 and 42. Thus, once the separator ply 128 is in place, it forms one layer of the respective flange of the lower and upper U-shaped channel 42 or 44, as illustrated in FIG. 14.

Also as illustrated in FIG. 14 and as discussed above, the web plies 118, filler plies 120 and separator plies 122 form the lower and upper U-shaped channels 42 and 44. Once formed, the lower and upper U-shaped channels 42 and 44 are placed together and joined as described above. Once the lower and upper U-channels 42 and 44 are joined, triangular gaps 134 (FIG. 14) are left between the flanges of the channels. The gaps 134 are filled in order to prevent voids and cavities in the formed composite part. As described above in the preferred embodiment, the gaps 134 are filled using the triangular radius fillers 46 and 48.

In the preferred embodiment, the radius fillers 46 and 48 are formed by cutting individual strips or layers of unidirectional composite prepreg lengthwise. These layers of unidirectional composite prepreg are stacked together to form a blank 140 as illustrated in FIG. 17. This blank 140 is then deformed and placed within a forming cavity 142 in the bottom 141 of a radius filler tool 62 (FIG. 16). The forming cavity 142 has a triangular cross-section and a sine wave shape corresponding to that desired for the formed radius fillers 46 and 48. The top 144 of the tool 62 is placed over the blank 140 and includes a male tool extension 145 that is sized to fit within the top of the forming cavity 142. Once the blank 140 is inserted into the forming cavity 142 and the top 144 is in place, the tool is heated to an appropriate processing temperature for the composite material used. The top and bottom tools 141 and 144 are then pressed together so that the male tooling extension 145 presses and forms the blank 140 to the interior shape of the forming cavity 142. After forming, the formed radius filler 46 or 48 is removed and placed within the gaps 134.

After the radius fillers 46 and 48 are placed within the gaps 134, the preconsolidated cap plies 132 are placed over the radius fillers and joined flanges of the lower and upper U-shaped channels 42 and 44. The resulting composite workpiece 38 is then placed within the tooling concept 40 as described above.

Also as described above, in the preferred embodiment the sine wave spar 30 has flanges that slope with respect to the central web 32. In addition, in some embodiments, the sine wave spar 30 may curve over its length (not illustrated). Therefore, in order to avoid trapping either the upper or lower tools 56 or 54 within the formed composite sine wave spar, the tools are formed of multiple pieces. In the preferred embodiment, both the lower and upper tools 54 and 56 are formed of three separate pieces.

As illustrated in FIG. 19, the lower tools 54 include a left tool 150, a right tool 152, and a center tool 154. The left, right, and center tools 150, 152, and 154 fit together as illustrated in FIG. 20 to form the lower tools 54. Each of the tools 150, 152, and 154 include upper forming surfaces that fit together to form the sine wave forming surface 55 used to form one surface of the central web 32. In the preferred embodiment, the inner surface of the left and right tools 150 and 152 are sloped inward as illustrated in FIG. 18. The center tool 154 has a wedge configuration that is wider at the bottom of the tool than at the top. This allows the tools 150, 152, and 154 to fit together while allowing the center tool 154 to be inserted or removed from between the left and right tools 150 and 152, both during assembly and disassembly of the tooling concept 40. The left, right, and center tools 150, 152, and 154 all include centrally located bores 164 FIG. 18) that pass through the width of the tools. The left, right, and center tools 150, 152 and 154 are maintained together after assembly by inserting tooling rods 166 through the bores 164 after the tools are assembled.

The side tools 58 and 60 rest upon the top of the left and right lower tools 150 and 152, respectively. As described above, the side tools 58 and 60 include forming surfaces 59 and 61 that define the exterior surface of the caps 50 and 52 FIG. 18) after the composite workpiece 38 is formed.

Figure 22:
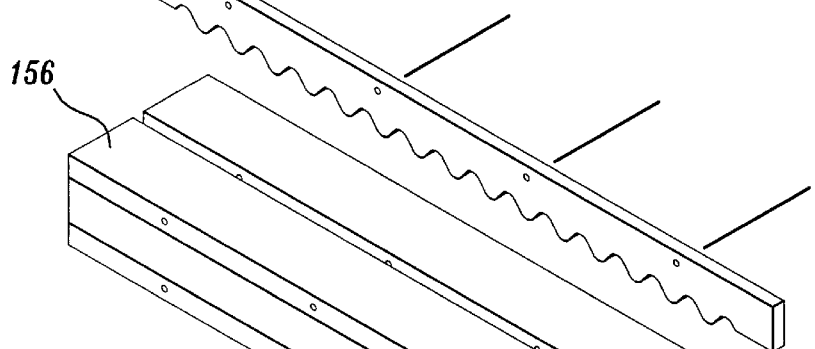
FIG. 22 is another partially exploded view of the sine wave spar tooling.

In the preferred embodiment, the lower tools 54 are first assembled as shown in FIG. 20. The composite workpiece 38 is then placed on the sine wave forming surface 55. The side tools 58 and 60 are then placed on either side of the composite workpiece 38. The upper tools 56 are then placed on top of the left and right side tools 58 and 60 as illustrated in FIGS. 18, 21 and 22.

The upper tools 56 include a left tool 156, a right tool 158, and a center tool 160. The upper left, right, and center tools 156, 158, and 160 fit together to form the upper forming surface 57 in a manner similar to that described with respect to the lower tools 54. The inner edges of the left and right upper tools 156 and 158 slope inward and the center tool 160 has a wedge shaped cross-section in a manner similar to that described with respect to the lower tools 54. This allows the upper tools 56 to fit together between the left and right side tools 58 and 60 as best seen in FIGS. 18 and 22. The upper tools 56 also include bores 166 that extend through the width of the tools. The upper tools 56 are held together by tool rods 166 (FIG. 21) in a similar manner as described above with respect to the lower tools 54.

Once the tooling concept 40 is assembled, the lower forming surface 55 defines the dimensions of the lower surface of the sine wave web 32 while the upper forming surface 57 defines the dimensions of the upper surface of the sine wave web 32. Similarly, the left and right forming surfaces 59 and 61 define the exterior dimensions of the caps 34 and 36.

Although the present invention has been described with respect to a particular tooling concept 40, other tooling concepts could also be used. In addition, depending upon the complexity and geometry of the sine wave spar 30 being formed, the tooling concept 40 may be broken down into more or less individual tools to prevent tool entrapment.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of forming a sine wave structure having a sine wave web and at least one flange extending outward from the web, the sine wave structure being formed from a composite prepreg material, the method comprising:

cutting individual layers of the composite prepreg material to form a web ply and a cap ply;

further cutting the web ply to form a plurality of teeth that extend outward from at least one edge of the web ply;

providing a tool having a forming surface that includes a sine wave contour and at least one edge;

deforming the web ply to the sine wave contour of the forming surface;

folding the teeth on the web ply over the at least one edge of the forming surface in a region of the sine wave contour to form a side flange;

cutting the composite prepreg material to form at least one filler ply having one or more recesses;

placing the filler ply adjacent to the folded over teeth of the web ply so that one or more of the folded over teeth extend into a corresponding one of said one or more recesses in the filler ply;

placing the cap ply adjacent to the side flange; and consolidating the web ply and the cap ply to produce the sine wave structure.

2. The method of claim 1, wherein said step of providing a tool having a forming surface comprises providing a tool having a U-shaped forming surface that includes the sine wave contour and opposing edges and wherein said step of folding to form a side flange comprises folding the plurality of teeth on the web ply over the opposing edges of the U-shaped forming surface in the region of the sine wave contour to form opposing side flanges, thereby forming a U-shaped channel having a central sine wave web.

3. The method of claim 2, further comprising forming lower and upper U-shaped channels in the web, each of the U-shaped channels including a central sine wave web contour and corresponding opposing side flanges.

4. The method of claim 3, further comprising joining the lower and upper U-shaped channels so that the central sine wave web of the lower U-shaped channel is adjacent to the sine wave web of the upper U-shaped channel and so that the corresponding side flanges of the upper and lower U-shaped channels are in line.

5. The method of claim 1, further comprising forming a triangular shaped radius filler having a sine wave contour from strips of the composite prepreg material.

6. The method of claim 4, further comprising forming a triangular shaped radius filler having a sine wave contour from strips of the composite prepreg material and placing the radius filler into a triangular gap created between an intersection of the opposing flanges of the joined lower and upper U-shaped channels.

7. The method of claim 1, further comprising cutting the composite prepreg material to form a separator ply so that one edge of the separator ply has a sine wave contour and placing the separator ply over the folded over teeth of the web ply to form one layer of the side flange.

8. The method of claim 1, further comprising determining the shape and dimensions of the teeth in order to reduce the formation of gaps between edges of the teeth after the teeth are folded over the at least one edge of the forming surface.

9. The method of claim 1, further comprising determining the shape and dimensions of the teeth in order to prevent the teeth from overlapping after the teeth are folded over the at least one edge of the forming surface.

10. The method of claim 1, wherein the step of cutting the web ply to form a plurality of teeth comprises performing said cutting of the web ply to provide said plurality of teeth with approximately the same size and shape.

11. The method of claim 1, wherein the sine wave contour of the tool defines peaks and valleys, and wherein said step of cutting the web ply to form a plurality of teeth, comprises performing said cutting of the web ply to provide said plurality of teeth with at least three different shapes, the plurality of teeth being shaped to extend substantially over a side of a peak of the sine wave contour.

12. The method of claim 1, wherein the sine wave contour of the tool defines peaks and valleys, and wherein said step of cutting the web ply to form a plurality of teeth comprises performing said cutting of the web ply to provide said plurality of teeth with at least eight different configurations, the plurality of teeth being shaped to extend substantially over a side of a peak of the sine wave contour.

13. The method of claim 1, wherein the step of folding the teeth on the web ply over the at least one edge of the forming surface in the region of the sine wave contour is performed by using a hot iron.

14. The method of claim 1, further comprising forming the sine wave structure from a unidirectional thermoplastic composite prepreg material.

15. The method of claim 1, further comprising joining the cap ply to the web ply and placing the joined cap ply and web ply within a rigid tool.

16. A method of forming a sine wave spar structure having a sine wave web that extends between opposing flanges, the method comprising:

cutting individual layers of a composite prepreg material to form web plies, filler plies including one or more recesses, and cap plies;

further cutting the web plies to form a plurality of teeth that extend outward from at least one edge of the web plies;

providing lower and upper tools having U-shaped forming surfaces that include a sine-wave contour and opposing edges that define at least a portion of the dimensions of the sine wave spar structure;

placing the web plies on the U-shaped forming surfaces of the lower and upper tools and deforming the web plies to the forming surfaces;

folding the teeth of the web plies over the opposing edges of the U-shaped forming surfaces in a region of the sine-wave contour to form the opposing flanges, thereby forming lower and upper U-shaped channels each having a central sine-wave web;

placing the filler plies adjacent to the folded over teeth of the web plies so that one or more of the teeth extend into the recesses and the filler plies to form one layer of at least one of the opposing flanges;

placing the cap plies adjacent to at least one of the opposing flanges to form a composite workpiece; and consolidating the composite workpiece to produce the sine wave spar structure.

17. The method of claim 16, further comprising joining the lower and upper U-shaped channels so that each said central sine wave web of the lower and upper U-shaped channels are adjacent and so that the opposing flanges of the lower and upper U-shaped channels are in line.

18. The method of claim 17, further comprising forming a triangular shaped radius filler having a sine wave contour from strips of the composite prepreg material and placing the radius filler into a triangular gap created between an intersection between the opposing flanges of the joined lower and upper U-shaped channels.

19. The method of claim 16, further comprising determining the shape and dimension of the teeth to reduce the formation of gaps between edges of the teeth after the teeth are folded over the opposing edges of the U-shaped forming surfaces.

20. The method of claim 16, further comprising determining the shape and dimensions of the teeth to prevent the teeth from overlapping after the teeth are folded over the opposing edges of the U-shaped forming surfaces.

21. The method of claim 16, further comprising forming the sine wave structure from a unidirectional thermoplastic composite prepreg material.

22. A method of forming a sine wave spar structure having a sine wave web that extends between opposing flanges, the method comprising:

cutting individual layers of a composite prepreg material to form web plies, filler plies, and cap plies;

further cutting the web plies to form a plurality of teeth that extend outward from at least one edge of the web plies;

providing lower and upper tools having U-shaped forming surfaces that include a sine-wave contour and opposing edges that define at least a portion of the dimensions of the sine wave spar structure;

placing the web plies on the U-shaped forming surfaces of the lower and upper tools and deforming the web plies to the forming surfaces;

folding the teeth of the web plies over the opposing edges of the U-shaped forming surfaces in a region of the sine-wave contour to form the opposing flanges, thereby forming lower and upper U-shaped channels each having a central sine-wave web;

placing the filler plies adjacent to the folded over teeth of the web plies to form one layer of at least one of the opposing flanges;

cutting the composite prepreg material to form separator plies so that one edge of the separator plies has a sine wave contour;

placing the separator plies over the folded over teeth of the web plies to form one layer of said at least one of the opposing flanges;

placing the cap plies adjacent to at least one of the opposing flanges to form a composite workpiece; and consolidating the composite workpiece to produce the sine wave spar structure.

* * * * *